INVENTOR.
ROBERT G. ARMSTRONG

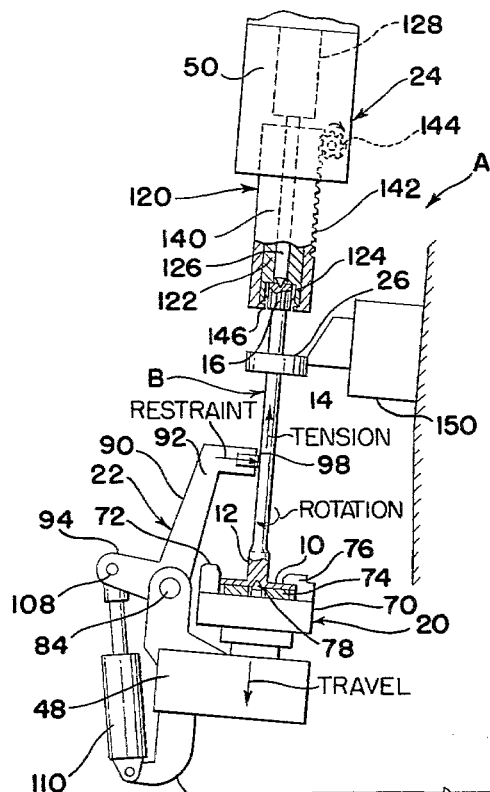
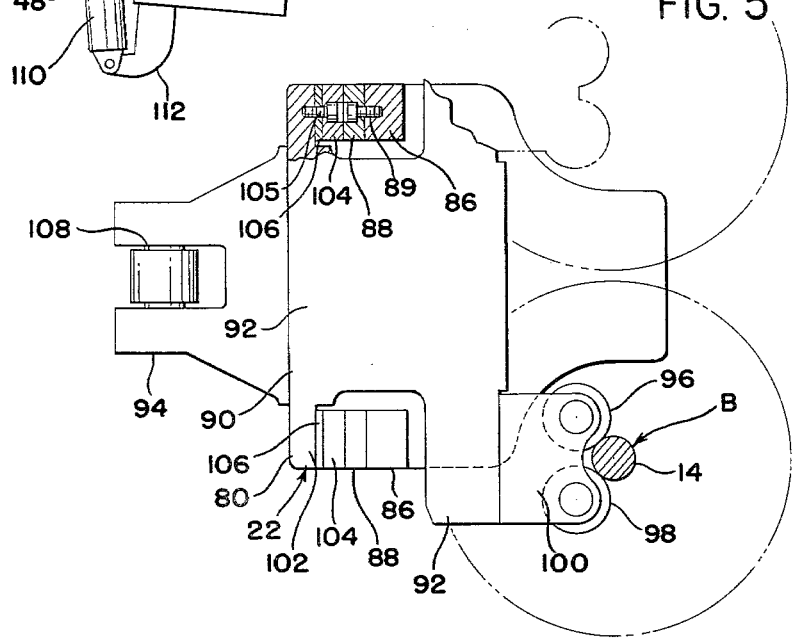

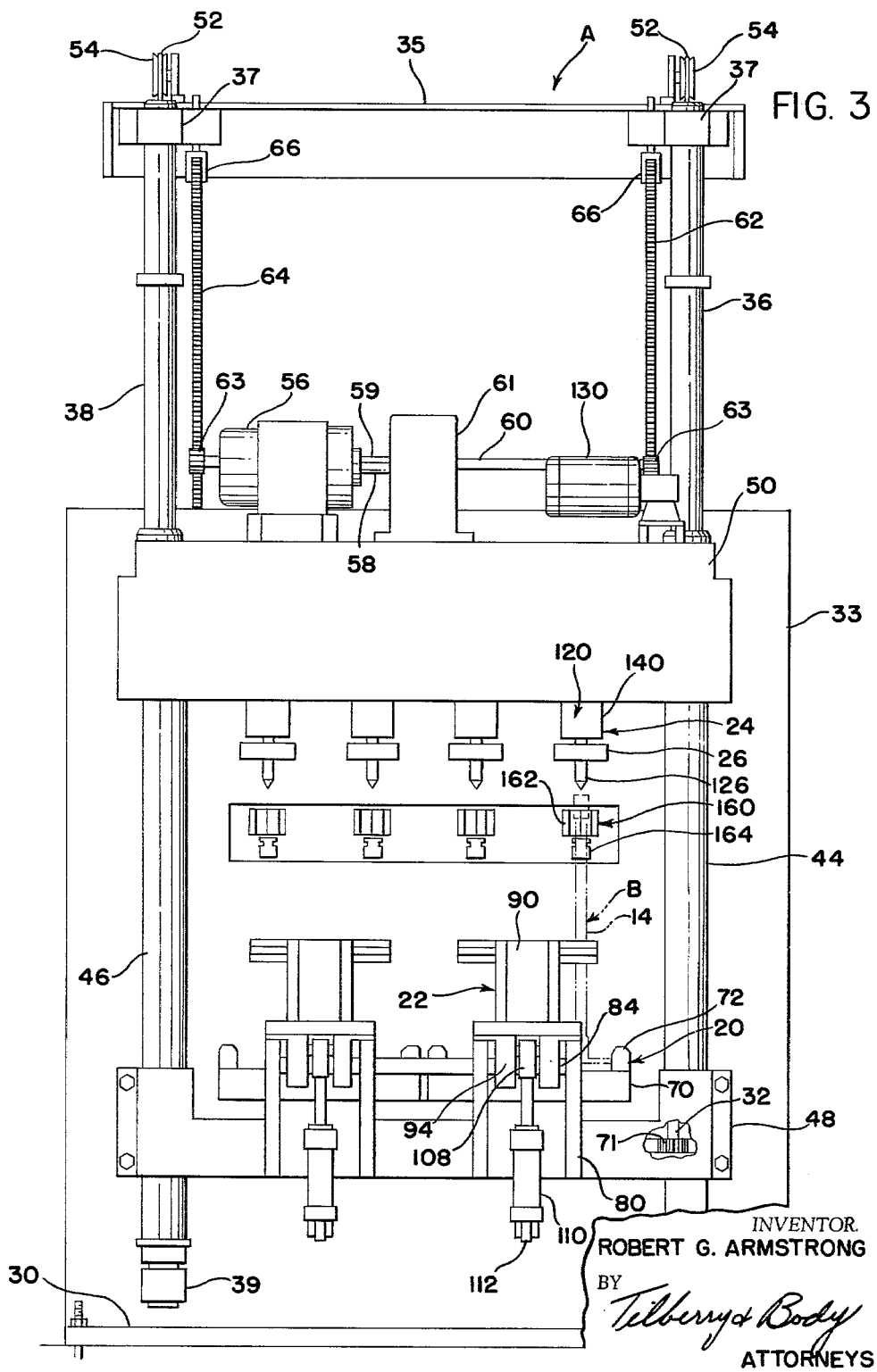

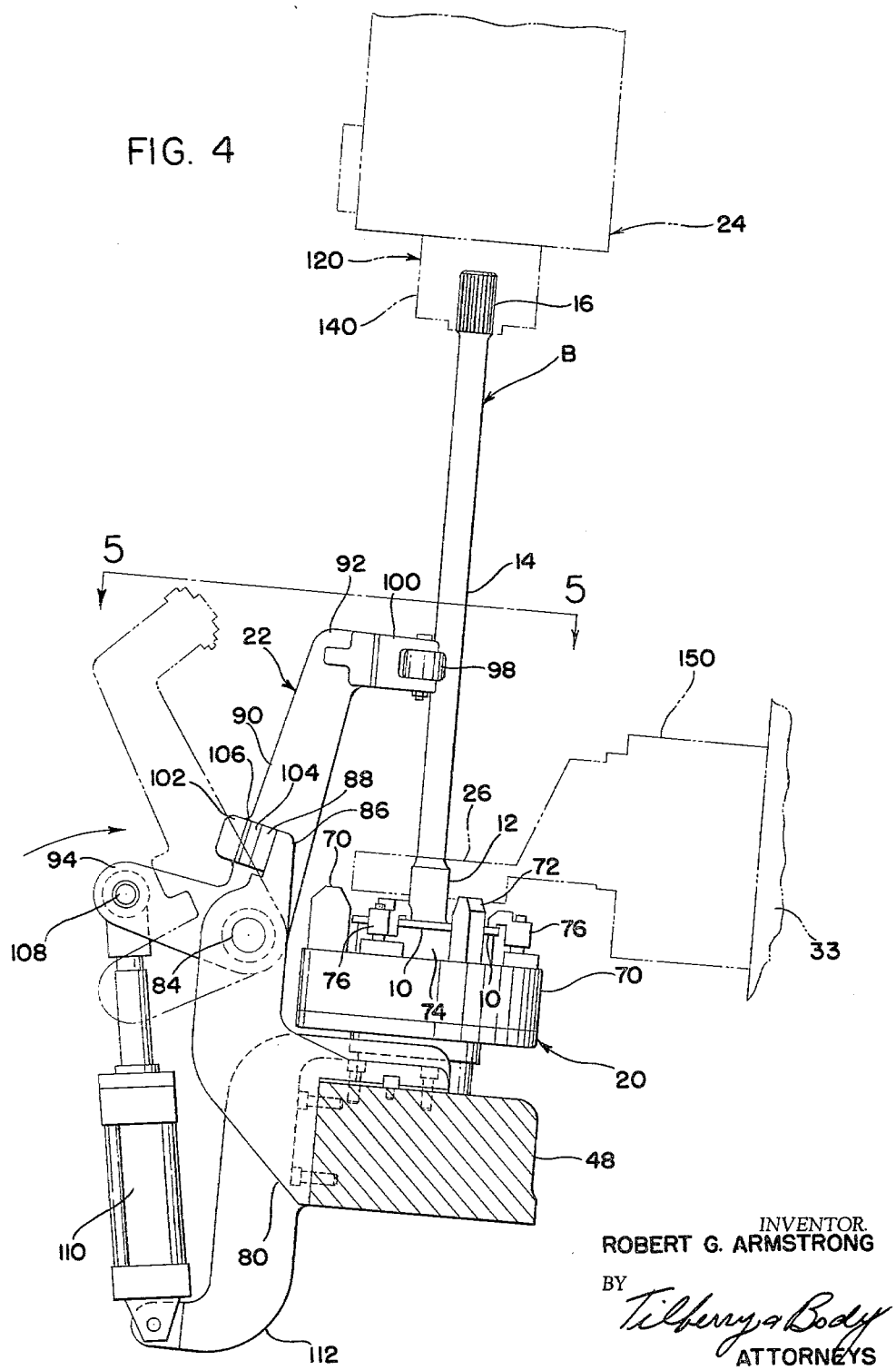

United States Patent Office 3,202,555
Patented Aug. 24, 1965

3,202,555
APPARATUS AND METHOD OF INDUCTIVELY HARDENING A SHAFT-LIKE MEMBER
Robert G. Armstrong, Chardon, Ohio, assignor to The Ohio Crankshaft Company, Cleveland, Ohio, a corporation of Ohio
Continuation of application Ser. No. 260,691, Feb. 25, 1963. This application Sept. 28, 1964, Ser. No. 402,983
2 Claims. (Cl. 148—131)

This application is a continuing application of my then co-pending application, Serial No. 260,691, filed February 25, 1963, now abandoned.

The present invention pertains to the art of induction heating and more particularly to an apparatus and method of inductively hardening a shaft-like metal member.

The present invention is particularly applicable to the art of inductively hardening automotive axles and it will be discussed with particular reference thereto; however, it is appreciated that the invention has much broader applications and may be used inductively hardening various shaft-like members, such as transmission shafts and torsion bars.

The term "shaft-like" as used hereinafter refers to any of a number of elongated members which are usually circular or elliptical in cross-section and have a substantially greater length than diameter. The term "shaft" as used hereinafter will indicate, without limitations, all of such shaft-like members.

It has become common practice in producing automotive axles, and other such shaft-like members, to harden the shafts by progressively heating the shafts along their lengths with an inductor powered by high frequency current and quenching the heated shafts either, progressively as they are being heated, or instantaneously after they are completely heated. Such methods of hardening shafts are generally carried out while the shafts are rotated between centers without any lateral or radial restraint being applied thereagainst. Consequently, it has been found that after the shafts had been hardened, they exhibited substantial radial or transverse run-out along their lengths. In most instances, this run-out caused eccentricities between the ends of the shafts which prevented the shafts from being acceptable for their intended use.

Accordingly, it has been heretofore somewhat standard procedure to straighten the shafts after they had been hardened. This involved an added operation which not only was time consuming and expensive, but also, tended to set up residual stresses within the shafts. During prolonged use, these residual stresses often were released so that the shafts assumed, somewhat, their original transverse run-out. Of course, this would require premature replacement of the shafts.

When the shafts were formed from a high carbon steel, such as commonly used for transmission shafts, the subsequent mechanical straightening of the shafts caused fine, hard to detect, surface cracks caused by stress concentrations along the length of the shafts and resulted in premature failure of the shafts.

These and other disadvantages are completely overcome by the present invention which is directed toward a method of hardening shaft-like members which method does not produce transverse run-out along the length of the members and, accordingly, does not necessitate a subsequent mechanical straightening operation.

In accordance with the present invention there is provided a method of hardening a shaft-like member comprising, rotating the member about its axis, scanning the length of the member with an energized inductor to raise the temperature of the member to the hardening temperature, quenching the member, maintaining the member under axial tension during heating and quenching thereof fixing a physical stop closely adjacent the member and remote from the ends of the member, and moving the stop away from the member when scanning in the vicinity of the stop.

It has been found that an axle or other shaft-like member hardened by the inductive method defined above is substantially free from large transverse or radial run-out which would necessitate a subsequent straightening operation to render the shaft satisfactory for its intended use.

The application of axial tension on the shaft, in combination with physically restraining the shaft from radial deflection, provides a greatly improved hardening method.

The primary object of the present invention is the provision of a method of induction hardening a shaft-like member which method is inexpensive to perform, consistent in results and does not cause sufficient transverse run-out to render the member unacceptable for its intended use.

Still another object of the present invention is the provision of a method as defined above which method includes the step of maintaining the shaft under axial tension while it is being hardened by induction heating and the step of phyisaclly restraining the member from substantial radial deflection during the hardening thereof.

These and other objects and advantages will become apparent from the following description used to illustrate the preferred embodiment of the invention as read in connection with the accompanying drawings in which:

FIGURE 1 is a somewhat schematic, side elevational view illustrating the preferred embodiment of the present invention;

FIGURE 3 is a front elevation of the apparatus as disclosed in FIGURE 2;

FIGURE 4 is a detailed side elevational view of the clamping device and physical restraint utilized in the apparatus shown in FIGURES 2 and 3; and FIGURE 5 is a partially cross-sectioned view taken generally along line 5—5 of FIGURE 4.

Figure 2:
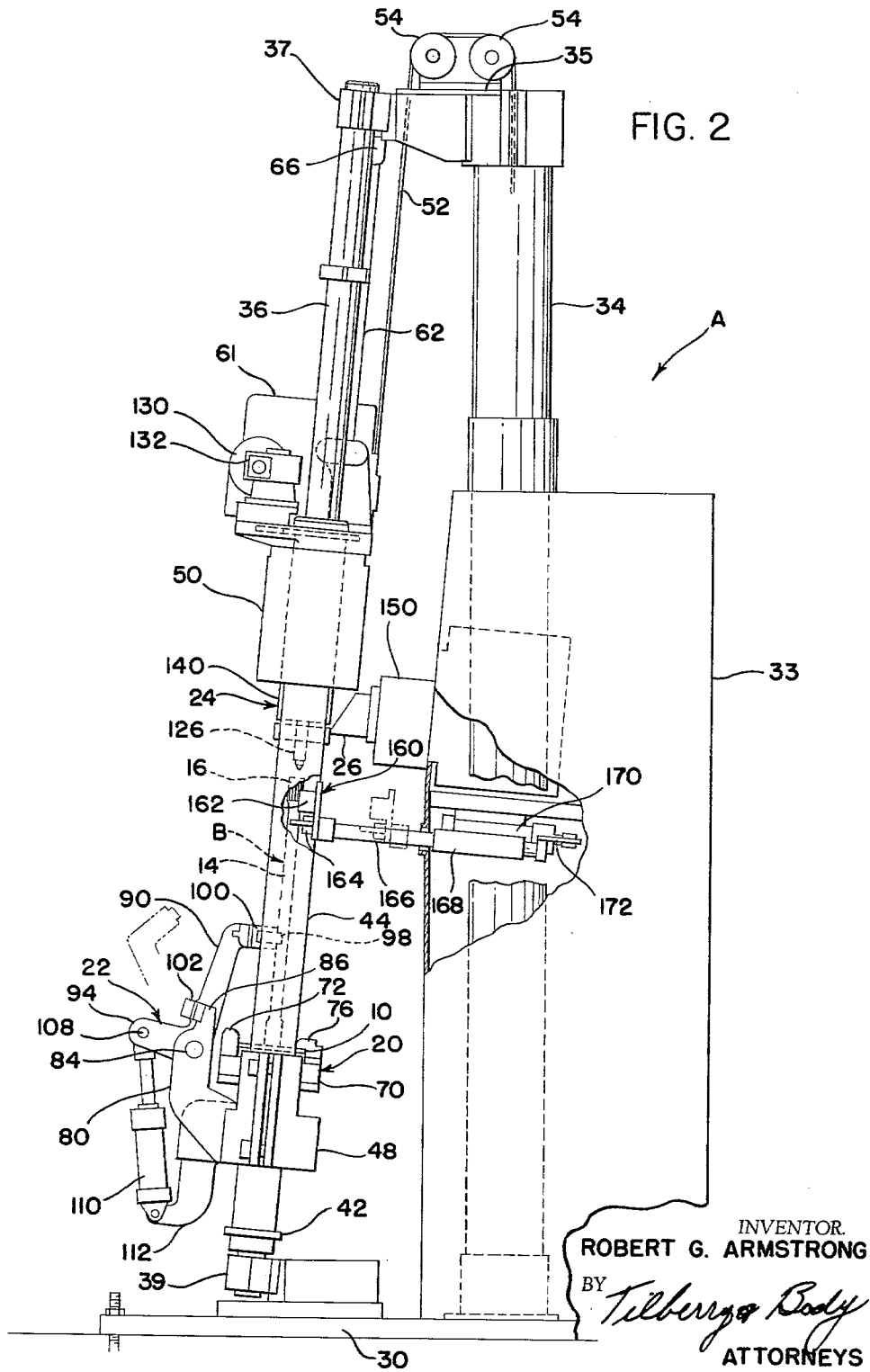
FIGURE 2 is a side elevational view illustrating the apparatus for accomplishing the present invention.

Referring now to the drawings, wherein the showings are for the purpose of illustrating a preferred embodiment of the invention only and not for the purpose of limiting same, FIGURE 1 shows, somewhat schematically, an apparatus A for hardening a shaft-like member B, which in accordance with the illustrated embodiment of the invention is an axle having a flange 10, a flange bearing 12, a shaft 14 and a splined end 16. Such an axle is of the type which is commonly used as the rear axle for an automobile.

FIGURE 1 illustrates the basic operating components of apparatus A as comprising a flange support and rotating means 20, a radial or transverse restraint 22, a means 24 for applying an axial tension onto the shaft 14, and an inductor 26. The present invention can be appreciated by a brief description of these various components and their intended functions.

The inductor 26, by appropriate drive means, scans the shaft 14 from the flanged end 10 to the splined end 16 so that the various portions of the axle are appropriately heated as as common practice in the induction heating art. Of course, the inductor 26 may include an integral quench body which directs a quenching fluid onto the shaft immediately below the scanning inductor 26. Means 20 rotates axle B and means 24 supplies an axial force to the shaft 14 which causes tension within the shaft 14 during the heating and quenching operation. This tension forces the shaft 14 to remain concentric with the axes of support 20 and means 24.

To further prevent any radial deflection of shaft 14 as it is being heated and quenched, the restraint 22 is held in close proximity or against the shaft 14 near its midpoint. The restraint 22 physically restrains the shaft 14 from detrimental transverse deflection. During operation, the restraint 22 shifts away from the shaft as inductor 26 passes thereby. In like manner, the means 24 shifts away from splined end 16 as the inductor approaches this end so that nothing interferes with the travel of the inductor.

The apparatus A as shown in FIGURE 1 is shown in more detail in FIGURES 2–5 that discloses an apparatus A for simultaneously hardening four axles B. It is to be appreciated that some components of the apparatus A are identical and are provided only to accommodate four separate shafts; however, for simplicity, only one set of components for the apparatus will be described in detail.

Referring now to FIGURES 2 and 3, in accordance with the preferred embodiment of the present invention, the apparatus A is supported on a base 30 that receives a cabinet 33 through which extends two support posts 34, only one of which is shown in FIGURE 2. In FIGURE 3 both support posts 34 are removed for simplicity. The upper portions of posts 34 are adjoined by a transversely extending upper frame 35 adapted to receive inclined carriage guide posts 36, 38 by a support bracket 37. The lower ends of the guide posts are connected onto base 30 by brackets 39.

Slidably received on guide posts 36, 38 are carriage tubes 44, 46 respectively which tubes support a lower carriage 48 and an upper carriage 50 that are in fixed spaced relationship with respect to each other. It is here appreciated that the spacing between the carriages may be appropriately adjusted to adapt the apparatus A for hardening workpieces having substantially different axial lengths. To counterbalance the weight of the moving carriages, there is provided, in accordance with the preferred embodiment of the present invention, a cable 52 entrained around pulleys 54 and attached to an appropriate counterbalancing device such as a weight (not shown).

To move the carriages longitudinally along guide posts 36, 38 there is provided a motor 56 having an output shaft 58 and a pair of shafts 59, 60 driven by gear box 61. Shafts 59, 60 terminate in a mechanism 63 having a pinion gear and a support roll between which a rack passes and is driven by rotation of the pinion gear. In apparatus A there are provided spaced racks 62, 64 each supported on frame 35 by a clevis 66.

It is appreciated that the carriages 48, 50 may be moved longitudinally with respect to the guide posts by the rack and pinion mechanism as described; however, various other mechanisms could be utilized for providing the proper movement of the carriages.

Flange support and rotating means 20 may assume a variety of structural embodiments; however, in accordance with the illustrated embodiment of the present invention, there is provided a rotatable base 70 having positioned in a circular path thereon locator blocks 72 surrounding a clamping ring 74. Spaced outwardly from the clamping ring and between the locator blocks are pivoted clamps 76 which are adapted to pivot radially inward and move downward against the flange 10 to clamp the flange against ring 74. Centrally disposed within the clamping ring is a spring biased center 78 adapted to be received within a recess at the flange end of axle B as is shown in FIGURE 1. The uppermost extended position of center 78 is beyond the ring 74 so that the axle is first received by the spring biased center and then pushed against the ring by the clamps 76. This assures proper centering of the axle and, thus, the shaft 14. The means 20 is rotated during operation of apparatus A by drive motor 130 which rotates vertically extending shaft 32 (see FIGURE 3) operably connected to bases 70 by gear train 71.

Clamps 76 securely hold the flange 10 within a plane substantially perpendicular to the theoretical axis of shaft 14.

To restrain radial or transverse deflection of axle B, there is provided the radial restraint 22 which, in accordance with the illustrated embodiment of the present invention, is adapted to contact or be closely spaced from the outer surface of shaft B. It is appreciated that individual restraints may be provided for the separate axles or they may be provided for restraint of a pair of axles as is shown in FIGURES 3 and 5. As disclosed, restraint 22 comprises bracket 80 appropriately secured onto the lower carriage 48 and having a transversely extending pivot shaft 84. Spaced upwardly from shaft 84 are stop arms 86 adapted to receive stop plates or inserts 88 by appropriate means such as a bolt 89. A bell crank 90 having a pressure arm 92 and a bifurcated actuator arm 94 is journaled onto the pivot shaft 84 and carries two sets of pressure rolls 96, 98 which are supported by a bracket 100 so that they contact spaced points on shaft B. It is appreciated, that the word "contact" is used to indicate that these rollers will provide physical restraint from substantial radial or transverse deflection of shaft 14 although the restraint, in some cases, may not be in actual physical contact with the shaft if there is not substantial deflection thereof.

To determine the amount of radially inward movement of rolls 96, 98 the pressure arm 92 is provided with a stop 102 having a stop plate 104 secured thereto by appropriate means such as a bolt 105. Between the stop plate and stop 102 there is provided a shim 106 which may be changed to determine the amount of inward movement of rolls 96, 98. Of course, it is possible to provide other arrangements for adjusting the inwardmost movement of the pressure rolls.

Between the bifurcated ends of the actuator arm 94 there is provided a shaft 108 adapted to receive the piston rod of cylinder 110 secured onto lower carriage 48 by a bracket 112.

It is appreciated, that actuation of cylinder 110 in an upwardly direction will move the rolls 96, 98 into contact with shaft 14 and the inwardmost position of the rolls will be determined by the thickness of shim 106. To move the rolls away from the shaft, the cylinder 110 is actuated in a downwardly direction.

Referring now to the tension applying device 24 which serves the function of applying an axial force thereon, this device includes an inner rotatable spindle 122 provided with radially movable wedging teeth 124 which are actuated by appropriate means (not shown) so that the spindle 122 can frictionally grip the splined end 16 of the axle in a manner whereby the splined end is maintained coaxial with the theoretical axis of shaft 14. Concentric with spindle 122 there is provided a center 126 actuated by a cylinder 128 so that the center may be moved axially with respect to shaft 14.

Concentrically arranged and adapted to journal the spindle 122 is an outer sleeve 140 having a longitudinally extending rack portion 142 adapted to coact with an appropriately driven pinion 144. By providing a lower shoulder 146 or any other means for allowing the outer sleeve to impart transverse movement to spindle 122 in either the upwardly or downwardly directions, the pinion 144 may move the outer sleeve and spindle upwardly or downwardly as desired. To apply tension on the shaft 14, in the illustrated embodiment of the present invention, the pinion 144 acts through rack 142 to cause a force to be exerted through teeth 124 onto the axial end of the shaft. Of course, it is appreciated that other means can be provided for imparting tension into the shaft.

In operation, the spindle and outer sleeve are moved over the spined end 16 and the fingers 124 are locked against the end of the shaft. Thereafter, retraction of the outer sleeve and spindle 122 by pinion 144 exerts a force on shaft 14. It is within the contemplation of the invention to exert sufficient force through the pinion 144 and rack 142 to create approximately 75 p.s.i. tension within shaft 14. It has been found, that a tension in the order of 50 to 200 p.s.i. will operate beneficially although the optimum is in the range of 75 p.s.i. Of course, it is realized that the optimum tension may vary with variations in the metal comprising the axle.

Referring now to the inductor 26, there is provided appropriate support 150 for securing the inductor in fixed relationship with respect to the apparatus A. Accordingly, as the carriages 48, 50 are moved longitudinally along shafts 36, 38, the inductor remains stationary.

Referring now more particularly to FIGURES 2 and 3, there is provided at each axle receiving station a locator 160 for locating the axle substantially coaxial with respect to the aligned centers 78, 126. This locator may assume a variety of structural embodiments; however, in accordance with the illustrated embodiment of the present invention, the locator comprises a V-block 162 and a spring clip 164. The locator is shifted into and out of engagement with the shaft B by shaft 166 reciprocally received within tubular guide 168 and operably connected onto a pneumatic cylinder 170 by coupling 172. The cylinder 170 operates the locator 160 at each station in unison through similar couplings 172.

The general or broad operating features of apparatus A were discussed in connection with the schematic view, FIGURE 1; however, in operation of the illustrated embodiment of the present invention shown in the remaining drawings, the carriages are located in their downwardmost position as shown in FIGURE 2 when the axles B are loaded. Locator 160 is moved forward by cylinder 170 so that the axle B can be located between the center 78 and the locator V-block 162. The bell crank 90 is retracted as is shown in the phantom lines in FIGURE 2 so that it does not interfere with the location of the shaft between the coaxially aligned centers. As the axle B is positioned as shown in FIGURE 2, the cylinder 128 moves center 126 downwardly into engagement with the splined end 16. It is noted, that the inductor 26 is positioned above the splined end of the shaft and the outer sleeve 140 is retracted by the pinion 144. After the center 126 engages the axle, the cylinder 170 retracts the locator 160 and the clamps 76 pull the flange of the shaft into clamping engagement with ring 74. In this condition, the axle is located between the coaxial centers and is secured in position by the flange support 20. There is no tension on the shaft since the cylinder 128 tends to compress the shaft.

To commence the heating operation, the carriages 58, 50 move in unison along shaft 36, 38 so that the shaft 14 is shifted with respect to the inductor 26 and the inductor is then located adjacent the flange 10. In this position, the outer sleeve 140 shifts downwardly and the wedging teeth 124 clamp against the splined end of the axle. Thereafter, the pinion 144 through rack portion 142 is actuated to apply an axial force onto the shaft 14. The amount of force applied by the pinion onto the rack is sufficient to cause the optimum tension within the shaft i.e. in most cases approximately 75 p.s.i. When the tension is applied to the shaft, the bell crank 90 is shifted so that the stop plate 104 contacts stop plate 88. Usually the rolls 96, 98 are approximately 1/64 inch away from the surface of the shaft, although this spacing may be varied somewhat in certain instances.

The apparatus A is now in condition to start the hardening operation. The motors 130 and 56 are actuated so that the spindle 122 is rotated and the power take-offs 58, 60 coact with racks 62, 64 to shift the carriages in the downward direction so that the inductor 26, which encircles the shaft 14, scans upwardly along the shaft. The inductor is energized so that the portion of the shaft immediately opposite the inductor is raised to a temperature in the hardening range thereof and, by providing an integral quench, as is common in the art, the shaft is quenched after it is heated by the inductor. As the carriages move downwardly so that the inductor 26 approaches the rolls 96, 98, an appropriate actuating means is provided for shifting the bell crank 90 outwardly until the inductor passes thereby. To harden the splined end 16 the collet 120 is shifted out of engagement with the splined end as the inductor approaches this portion of the shaft.

In practice, an apparatus constructed in accordance with the illustrated embodiment of apparatus A, hardens axles for automotive use without requiring subsequent straightening operations. In other words, the run-out of the flange 10 and other portions of the axle are not sufficient to require straightening. It was found in some instances, that a shaft hardened in an apparatus constructed in accordance with apparatus A, actually had less run-out after hardening than before. This was a substantial improvement over any known axle hardening apparatus.

The present invention has been discussed in connection with certain structural embodiments; however, it is appreciated that these disclosed structural embodiments are not intended to limit the spirit and scope of the present invention as defined in the appended claims.

I claim:

1. In an induction heating apparatus for surface hardening a steel shaft having first and second ends, said apparatus comprising: a first clamping device for holding said first end, a second clamping device for holding said second end, power means for rotating said clamping devices and said shaft as a unit, an inductor surrounding said shaft, a high frequency power source for energizing said inductor with a high frequency alternating current, drive means for causing relative movement between said rotating shaft and said energized inductor, said relative movement being at a rate sufficient to raise the temperaturen of the surface of said shaft to its hardening temperature and means for progressively quenching said shaft after it has been heated, the improvement comprising: a power means for exerting a force between said first and second clamping means to impose a tensile stress in said rotating shaft of a magnitude below the yield point of said shaft, an abutment positioned adjacent said rotating shaft and near the midpoint between the ends of said shaft and means for shifting said abutment away from said shaft when said inductor is moving along said shaft in the vicinity of said midpoint.

2. A method of surface hardening a steel shaft-like member comprising, rotating said member about its axis, scanning the length of said member with an energized inductor to raise the temperature of the surface of said member to the hardening temperature thereof, simultaneously, but somewhat delayed, scanning the length of said member with a stream of quenching fluid, fixing a physical stop closely adjacent the member and remote from the ends of said member, moving said stop away from said member when scanning in the vicinity of said stop, and applying to said member an axial tension stress below the yield point of said member and during both the heating and quenching thereof.

References Cited by the Examiner

UNITED STATES PATENTS

| | | | |
|---|---|---|---|
| 1,852,528 | 4/32 | Kinney | 266—4 |
| 2,049,830 | 8/46 | Bayless | 148—153 |
| 2,573,308 | 10/51 | Chamberlin et al. | 266—4 |
| 2,643,325 | 6/53 | Body et al. | 148—156 |
| 2,783,788 | 3/57 | Ungerer | 148—13 |
| 2,787,566 | 4/57 | Seulen et al. | 148—154 |
| 2,836,527 | 5/58 | Kessler et al. | 148—11.5 |
| 2,935,433 | 5/60 | Pribyl | 148—156 |

DAVID L. RECK, *Primary Examiner.*